(12) United States Patent
Bao et al.

(10) Patent No.: US 10,572,309 B2
(45) Date of Patent: Feb. 25, 2020

(54) COMPUTER SYSTEM, AND METHOD FOR PROCESSING MULTIPLE APPLICATION PROGRAMS

(71) Applicant: HUAWEI TECHNOLOGIES CO., LTD., Shenzhen, Guangdong (CN)

(72) Inventors: YunGang Bao, Beijing (CN); Jiuyue Ma, Beijing (CN); Xiufeng Sui, Beijing (CN); Rui Ren, Beijing (CN); Lixin Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 187 days.

(21) Appl. No.: 15/335,456

(22) Filed: Oct. 27, 2016

(65) Prior Publication Data

US 2017/0046202 A1    Feb. 16, 2017

Related U.S. Application Data

(63) Continuation of application No. PCT/CN2015/072672, filed on Feb. 10, 2015.

(30) Foreign Application Priority Data

Apr. 30, 2014    (CN) .......................... 2014 1 0182148
Nov. 24, 2014    (CN) .......................... 2014 1 0682375

(51) Int. Cl.
*G06F 9/46*    (2006.01)
*G06F 9/50*    (2006.01)
(Continued)

(52) U.S. Cl.
CPC .......... *G06F 9/5011* (2013.01); *G06F 9/4881* (2013.01); *G06F 9/50* (2013.01);
(Continued)

(58) Field of Classification Search
CPC ........ G06F 9/5011; G06F 9/4881; G06F 9/50; G06F 9/5027
See application file for complete search history.

(56) References Cited

U.S. PATENT DOCUMENTS 5,787,469 A    7/1998    Merrell
6,430,642 B1 *    8/2002    Stracovsky ......... G06F 12/0215
                                                                                    709/222
(Continued)

FOREIGN PATENT DOCUMENTS

CN    1538297 A    10/2004
CN    1602468 A    3/2005
(Continued)

OTHER PUBLICATIONS

J. Dean, "Achieving Rapid Response Times in Large Online Services", talk at Berkeley, 2012. total 83 pages.
(Continued)

Primary Examiner — James J Lee
(74) Attorney, Agent, or Firm — Huawei Technologies Co., Ltd.

(57) ABSTRACT

A computer includes a processor and multiple components directly or indirectly connected to the processor. Each component is coupled to a control device, and is configured to provide resources for one or more application programs running in the computer. The processor, when executing an application program, attaches a tag to an application request, and sends the tag-attached application request to a control device coupled with a component to which the tag-attached application request is directed. The control device receives the tag-attached application request, determines, based on the tag and a resource allocation policy, an amount of resources in the component and instructs the component to allocate the amount of resources and process the application (Continued)

request in accordance with the amount of resources allocated for the application request.

14 Claims, 7 Drawing Sheets

(51) Int. Cl.
   *G06F 9/48* (2006.01)
   *G06F 9/54* (2006.01)
(52) U.S. Cl.
   CPC .......... *G06F 9/5027* (2013.01); *G06F 9/5044* (2013.01); *G06F 9/546* (2013.01)

(56) References Cited

U.S. PATENT DOCUMENTS

| | | |
|---|---|---|
| 7,339,942 B2 | 3/2008 | Morgan et al. |
| 7,797,699 B2 | 9/2010 | Kagi et al. |
| 8,458,711 B2 | 6/2013 | Illikkal et al. |
| 2002/0169907 A1 | 11/2002 | Candea et al. |
| 2004/0210871 A1 | 10/2004 | Hasegawa et al. |
| 2005/0160428 A1 | 7/2005 | Ayachitula et al. |
| 2006/0136988 A1 | 6/2006 | Raja et al. |
| 2006/0168383 A1 | 7/2006 | Lin |
| 2006/0179196 A1* | 8/2006 | Gray ................ G06F 13/14 710/240 |
| 2007/0124446 A1 | 5/2007 | Coulthard et al. |
| 2008/0075101 A1 | 3/2008 | Illikkal et al. |
| 2008/0209428 A1 | 8/2008 | Baryshnikov et al. |
| 2009/0138682 A1 | 5/2009 | Capps, Jr. et al. |
| 2009/0222514 A1 | 9/2009 | Igarashi |
| 2010/0005478 A1* | 1/2010 | Helfman ............ H04L 67/2804 719/315 |
| 2010/0217868 A1 | 8/2010 | Heller, Jr. |
| 2011/0131332 A1 | 6/2011 | Bouazizi |
| 2011/0314157 A1 | 12/2011 | Saito |
| 2012/0044938 A1 | 2/2012 | He |
| 2012/0144253 A1 | 6/2012 | Comparan et al. |
| 2012/0271952 A1 | 10/2012 | Heller, Jr. |
| 2014/0173620 A1 | 6/2014 | Chai et al. |

FOREIGN PATENT DOCUMENTS

| | | |
|---|---|---|
| CN | 1645815 A | 7/2005 |
| CN | 1855839 A | 11/2006 |
| CN | 1964320 A | 5/2007 |
| CN | 102004674 A | 4/2011 |
| CN | 102195882 A | 9/2011 |
| CN | 102289385 A | 12/2011 |
| CN | 102334103 A | 1/2012 |
| CN | 102958166 A | 3/2013 |
| EP | 1303087 A2 | 4/2003 |
| EP | 2141645 A1 | 1/2010 |
| EP | 2388700 A2 | 11/2011 |
| JP | 2005513587 A | 5/2005 |
| JP | 2006202244 A | 8/2006 |
| JP | 2007226280 A | 9/2007 |
| JP | 2012518825 A | 8/2012 |
| JP | 2013206233 A | 10/2013 |
| KR | 20110118810 A | 11/2011 |
| RU | 2460213 C2 | 8/2012 |
| RU | 2496277 C2 | 10/2013 |
| WO | 02091180 A2 | 11/2002 |

OTHER PUBLICATIONS

L. Barrosa, J. Clidaras, U. Holzle, The Datacenter as a Computer (An Introduction to the Design of Warehouse-Scale Machines 2nd Edition), Jul. 2013. total 156 pages.

Bin Li et al, MIT and Intel "Dynamic QoS Management for Chip Multiprocsssors", ACM Transactions on Architecture and Code Optimization, vol. 9, No. 3, Article 17, Publication date: Sep. 2012. total 29 pages.

C. Kozyrakis, Resource Efficienct Computing for Warehouse-scale Datacenters, in the Conference on Design Automation and Test in Europe (DATE), Grenoble, France, Mar. 2013. total 6 pages.

ONF white paper, Software-Defined Networking: the New Norm for Networks, Apr. 13, 2012. total 12 pages.

J. Dean, L. Barroso, "The tail at scale", Communication of the ACM, Feb. 2013. total 7 pages.

Schurman, E., and J. Brutlag, "Performance Related Changes and their User Impact," Proc. Velocity: Web Performance and Operations Conf., 2009. total 13 pages.

* cited by examiner

COMPUTER SYSTEM, AND METHOD FOR PROCESSING MULTIPLE APPLICATION PROGRAMS

CROSS-REFERENCE TO RELATED APPLICATIONS

This application is a continuation of International Application No. PCT/CN2015/072672, filed on Feb. 10, 2015, which claims priority to Chinese Patent Application No. 201410182148.1, filed on Apr. 30, 2014 and Chinese Patent Application No. 201410682375.0, filed on Nov. 24, 2014, all of which are hereby incorporated by reference in their entireties.

TECHNICAL FIELD

The present application relates to the computer field, and in particular, to a computer, a control device, and a data processing method.

BACKGROUND

In order to improve operating efficiency of a computer or server, multiple application programs may share resources within the computer. For example, the multiple application programs may apply to a memory for resources at the same time, thereby improving memory resource utilization. However, multiple application programs may interfere with each other when sharing a resource, and therefore some important application programs cannot be processed preferentially, thereby affecting service quality.

SUMMARY

Embodiments of the present application provide a computer, a control device, and a data processing method, aimed to improve service quality of application programs.

A first aspect of the embodiments of the present application provides a computer, where the computer includes a processing unit and a control device, where:

the processing unit is configured to attach a tag to an application request, and send, to the control device, the attached application request; and the control device is configured to receive the attached application request, and determine, according to the tag and a pre-stored resource allocation policy, a quantity of resources allocated for the application request, where the resource allocation policy includes a correspondence between the tag and the quantity of resources allocated for the application request; and further configured to instruct a component of the computer to process the application request according to the quantity of resources allocated for the application request.

With reference to the first aspect, in a first possible implementation manner, the control device further includes a buffer, the buffer includes at least two queues, each queue corresponds to a range of quantities of resources, and a priority of each queue is different;

the control device is specifically configured to select, from the at least two queues according to the quantity of resources allocated for the application request, a queue corresponding to the application request, and store the application request in the queue corresponding to the application request; and the component of the computer is configured to obtain the application request from the queue corresponding to the application request and execute the application request.

With reference to the first aspect, in a second possible implementation manner, the control device further includes a processor and a cache, where the cache stores the resource allocation policy; and the processor is further configured to acquire the resource allocation policy from the cache.

With reference to the second possible implementation manner of the first aspect, in a third possible implementation manner, the resource allocation policy includes a control table, the control table includes multiple entries, and one entry of the multiple entries includes the correspondence between the tag and the quantity of resources allocated for the application request;

the processor is specifically configured to send a query instruction to the cache, where the query instruction includes the tag; and the cache is configured to obtain, according to the query instruction, an entry corresponding to the tag, and send the entry corresponding to the tag to the processor of the control device.

With reference to the first aspect or the first to third possible implementation manners of the first aspect, in a fourth possible implementation manner of the present application, the control device further includes a programming interface, and the programming interface is configured to modify the resource allocation policy.

With reference to the first aspect or the first to fourth possible implementation manners of the first aspect, in a fifth possible implementation manner, the computer further includes a memory, where the memory stores node management software;

the processing unit is further configured to define the resource allocation policy by using the node management software; and the control device is further configured to acquire the resource allocation policy from the node management software, and write the resource allocation policy into the cache.

With reference to the fifth possible implementation manner of the first aspect, in a sixth possible implementation manner, the processing unit further includes a tag register;

the processing unit is further configured to define the tag by using the node management software, and write the tag into the tag register by using the node management software; and the processing unit is further configured to read the tag from the tag register.

A second aspect of the embodiments of the present application provides a control device, where the control device is disposed on a component of a computer, and the control device includes a processor, where the processor is configured to receive an application request to which a tag is attached, and determine, according to the tag and a pre-stored resource allocation policy, a quantity of resources allocated for the application request, where the resource allocation policy includes a correspondence between the tag and the quantity of resources allocated for the application request; and further configured to instruct the component of the computer to process the application request according to the quantity of resources allocated for the application request.

With reference to the second aspect, in a first possible implementation manner, the control device further includes a buffer, the buffer includes at least two queues, each queue corresponds to a range of quantities of resources, and a priority of each queue is different;

the processor is specifically configured to select, from the at least two queues according to the quantity of resources allocated for the application request, a queue corresponding to the application request, and store the application request in the queue corresponding to the application request; and the component of the computer is configured to obtain the application request from the queue corresponding to the application request and execute the application request.

With reference to the second aspect, in a second possible implementation manner, the control device further includes a cache, where the cache stores the resource allocation policy; and the processor is further configured to acquire the resource allocation policy from the cache.

With reference to the second possible implementation manner of the second aspect, in a third possible implementation manner, the resource allocation policy includes a control table, the control table includes multiple entries, and one entry of the multiple entries includes the correspondence between the tag and the quantity of resources allocated for the application request;

the processor is specifically configured to send a query instruction to the cache, where the query instruction includes the tag; and the cache is configured to obtain, according to the query instruction, an entry corresponding to the tag, and send the entry corresponding to the tag to the processor.

With reference to the second aspect or the first to third possible implementation manners of the second aspect, in a fourth possible implementation manner, the control device further includes a programming interface, and the programming interface is configured to modify the resource allocation policy.

With reference to the second aspect or the first to fourth possible implementation manners of the second aspect, in a fifth possible implementation manner, the resource allocation policy is defined by the computer by using node management software and is sent to the control device, where the node management software is stored in a memory of the computer.

A third aspect of the embodiments of the present application provides a data processing method, where the method is applied to a control device, the control device is disposed on a component of a computer, and the method includes:

receiving, by the control device, an application request carrying a tag;

determining, by the control device according to the tag and a pre-stored resource allocation policy, a quantity of resources allocated for the application request, where the resource allocation policy includes a correspondence between the tag and the quantity of resources allocated for the application request; and instructing, by the control device, the component of the computer to process the application request according to the quantity of resources allocated for the application request.

With reference to the third aspect, in a first possible implementation manner, the control device further includes a buffer, the buffer includes at least two queues, each queue corresponds to a range of quantities of resources, and a priority of each queue is different; and the instructing, by the control device, the component of the computer to process the application request according to the quantity of resources allocated for the application request includes:

selecting, by the control device from the at least two queues according to the quantity of resources allocated for the application request, a queue corresponding to the application request, and storing the application request in the queue corresponding to the application request, so that the component of the computer obtains the application request from the queue corresponding to the application request and execute the application request.

With reference to the third aspect, in a second possible implementation manner, the control device further includes a processor and a cache, where the cache stores the resource allocation policy; and the method further includes: acquiring, by the processor of the control device, the resource allocation policy from the cache.

With reference to the second possible implementation manner of the third aspect, in a third possible implementation manner, the resource allocation policy includes a control table, the control table includes multiple entries, and one entry of the multiple entries includes the correspondence between the tag and the quantity of resources allocated for the application request;

the acquiring, by the processor of the control device, the resource allocation policy from the cache includes: sending, by the processor of the control device, a query instruction to the cache, where the query instruction includes the tag; and obtaining, by the cache according to the query instruction, an entry corresponding to the tag, and sending the entry corresponding to the tag to the processor of the control device.

The embodiments of the present application provide a computer, where the computer includes a processing unit and a control device. The processing unit attaches a tag to an application request, and sends, to the control device, the attached application request; the control device determines, according to the tag and a pre-stored resource allocation policy, a quantity of resources allocated for the application request, and instructs a component of the computer to process the application request according to the quantity of resources allocated for the application request. In this way, when processing the application request, the component of the computer may perform processing according to the quantity of resources allocated for the application request, which, to some extent, prevents a quantity of resources from being mutually preempted by multiple application requests, thereby improving service quality.

BRIEF DESCRIPTION OF DRAWINGS

The following briefly introduces the accompanying drawings used in describing the embodiments.

DESCRIPTION OF EMBODIMENTS

The following describes the technical solutions in the embodiments of the present application with reference to the accompanying drawings.

The embodiments of the present application provide a computer, a control device, and a data processing method, for improving service quality of an application program.

Figure 1:
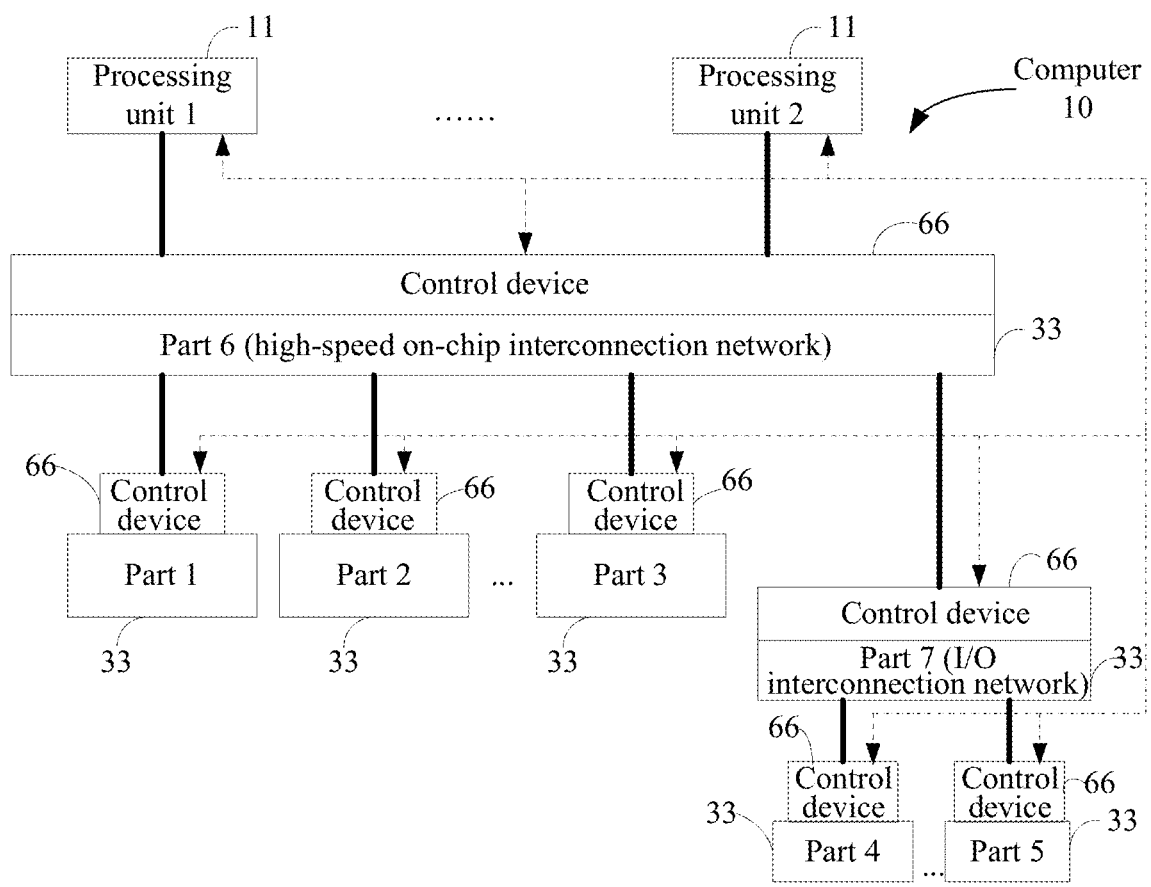
FIG. 1 is a system architecture diagram of a computer according to an embodiment of the present application.

FIG. 1 is a system architecture diagram of a computer 10. As shown in FIG. 1, the computer 10 includes multiple processing units 11, multiple control devices 66, and multiple components 33 (which are referred to as parts for short in FIG. 1). A component of the computer has resources, and the resources may be occupied by multiple application programs.

A processing unit 11 is one of processor cores that have same functionalities and that form a central processing unit (CPU). The processor 11 is configured to execute various operation commands such as read and write.

The components 33 of the computer include a high-speed on-chip interconnection network, and various components that are of the computer and that are directly connected to the high-speed on-chip interconnection network. For example, such a component may be a cache, a memory, a graphic processing unit (GPU), and a video random access memory (RAM). Further, a component may be an input/output (I/O) interconnection network, and other components such as I/O devices are connected to the I/O interconnection network. Such I/O devices may be, for example, a magnetic disk (also referred to as a hard disk), a network adapter, and a display.

As shown in FIG. 1, the high-speed on-chip interconnection network connects the multiple processing units 11, and also connects to a cache, a memory, a graphic processing unit, a video RAM, and the like.

For a cache, a resource allocated by the cache to an application program may be a cache space. For a memory, a resource allocated by the memory to an application program may be a memory space. For a graphic processing unit, a resource allocated by the graphic processing unit to an application program may be a hardware acceleration resource. For a video RAM, a resource allocated by the video RAM to an application program may be a video RAM space.

In addition, the high-speed on-chip interconnection network may also be connected to the I/O interconnection network (also referred to as a south bridge).

The I/O interconnection network is a device for controlling I/O devices.

The component 33 of the computer further includes the I/O devices directly connected to the I/O interconnection network, for example, a magnetic disk (also referred to as a hard disk), a network adapter, and a display.

For example, the computer 10 may process multiple application programs at same time, and these application programs may need to occupy resources of a component (for example, a memory) of the computer at the same time. However, because resources in the memory are limited, some important application programs may be processed in a timely manner, and therefore service quality is affected.

Therefore, in order to solve this problem, in the computer 10, various control devices 66 are configured on components 33 whose resources may be applied for or occupied by multiple application programs. Each of the control devices 66 is configured to allocate different quantities of resources of its corresponding component 33 to the application programs who apply resources of it according to different types of the application programs, and allows for processing the application programs accordingly. Herein, the components of the computer, whose resources may be applied for or occupied by the multiple application programs, include but are not limited to: a high-speed on-chip interconnection network, a cache, a memory, a graphic processing unit, a video RAM, and an I/O interconnection network.

It should be noted that, the control device 66 may be configured only on one component of the multiple components of the computer; or the control devices 66 may be configured on multiple components of the computer; or even, the control devices 66 may be configured on all of the above-mentioned components of the computer.

In order for the control device 66 to identify the application programs of different types, an application request corresponding to an application program needs to carry a tag to identify the application's type, and the tag is attached at a source end at which the application request is generated. Therefore, when the application request is sent to the control device 66 on a component of the computer, the control device 66 may process the application program according to the type of the program that is represented by the tag. The application requests include various instructions generated inside the computer and various instructions received from outside of the computer, for example, a file access request, a video playback request, a memory access request, an I/O request, and an interconnect request, etc.

Herein, the source end, at which an application request is generated, may be the processing unit 11 or the I/O device (for example, a network adapter). When the application request is locally from the computer 10, the source end at which the application request is generated may be the processing unit 11. When the application request is from the outside of the computer 10, for example, when application request sent from the Internet is received, the source end at which the application request is generated may be regarded as the network adapter or another input-output device.

Figure 2A:
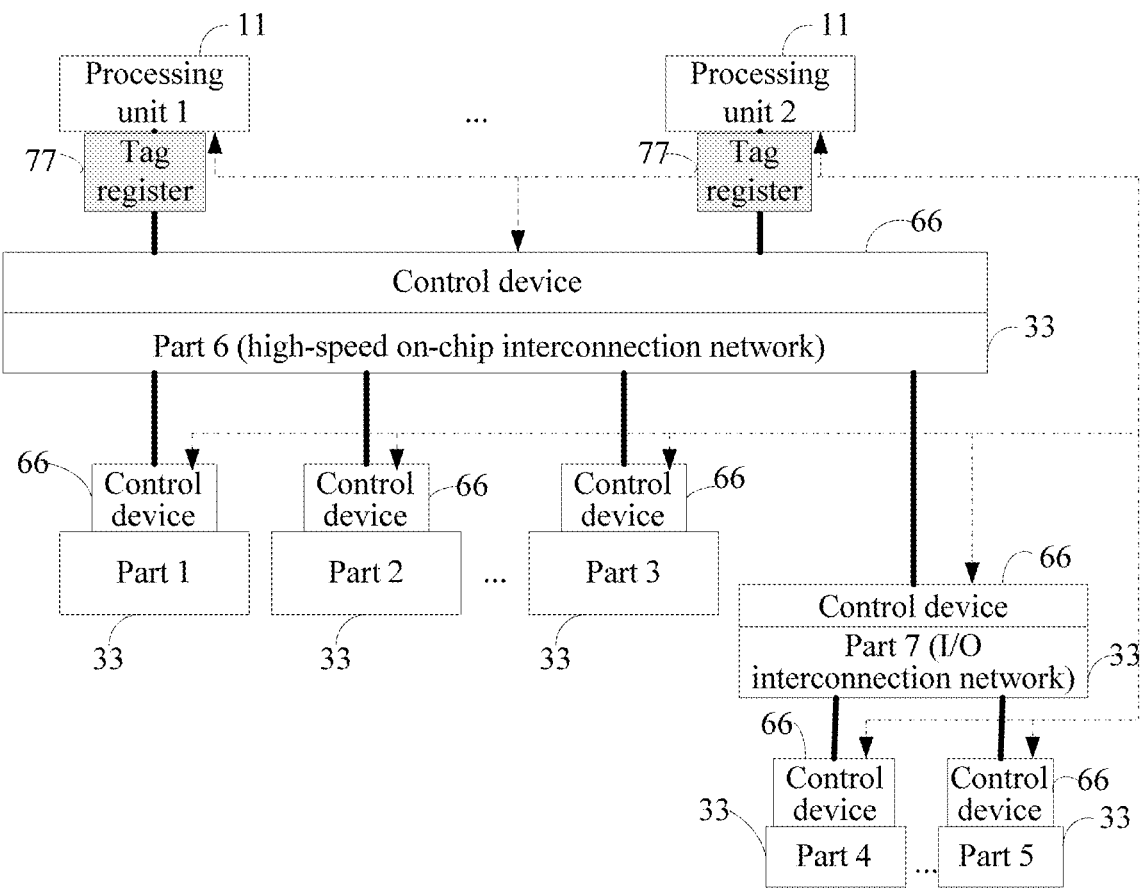
FIG. 2a is a system architecture diagram of another computer according to an embodiment of the present application.

When an application request is from an inside of the computer 10, a manner of tagging the application request may be as follows:

A tag register 77 (as shown in FIG. 2a) is configured in the processing unit 11, and the tag register 77 stores a register value. When the processing unit 11 generates an application request, the processing unit 11 attaches a tag to the application request by reading the register value, where the tag is the register value.

Specifically, the tag is defined by node management software (which is described in detail in the following) for the application request. The node management software may be a module in an operating system, or a module in a middle software layer (Hypervisor) between the operating system and computer hardware, and runs in the processing unit 11. After the node management software defines a tag for an application request, the operating system may write the tag into a context of a process corresponding to the application request, and then write the context of the process corresponding to the application request into the register.

An optional implementation manner is as follows:

Because the processing unit 11 itself may include multiple registers, one register of the multiple registers may be set as the tag register 77, where the tag register 77 is configured to store a tag of an application program. When generating an application request, the processing unit 11 reads a register value in the tag register 77, uses the register value as a tag, and writes the register value into the application request. It may be understood that, the tag may be represented by an ID of the application program, a letter, a number, or the like, which is not limited herein.

Another optional implementation manner is as follows:

A new register is configured in the processing unit 11, and the new register is defined as the tag register 77. The tag register 77 is configured to store a tag of an application program. A manner of subsequent processing is the same as the foregoing implementation manner and is not described herein again.

When the network adapter is a source end of an application request, in an implementation manner, the network adapter itself does not tag the application request. For example, when the network adapter receives the application request, the application request already carries a tag. That is, a sending end of the application request may tag the application request before sending the application request. It may be understood that, in a distributed system, servers (or computers) may determine a tag of an application request by means of negotiation, or a tag server may be equipped to define and send a tag of an application request to each server. All of similar implementation manners shall fall within the protection scope of the present application. Another implementation manner is as follows: when the network adapter receives a message packet, an application request is obtained by parsing the message packet, and then the application request is tagged. In this case, a manner of tagging the application request by the network adapter is similar to the manner, which is described above, of tagging by the processing unit 11 and is not described herein again.

It should be noted that, another component, for example, an I/O interconnection network, inside the computer 10 may also attach a tag to an application request, an implementation manner thereof is similar to that of the processing unit 11 or the network adapter, and this embodiment of the present application sets no limit to a component for tagging.

The following describes a subsequent processing procedure by using an example in which the processing unit 11 attaches a tag to an application request.

After the tag is attached to the application request, the processing unit 11 sends the application request to the control device 66, the application request carries the tag.

Specifically, the control device 66 receives the attached application request, and determines, according to the tag and a pre-stored resource allocation policy, a quantity of resources allocated for the application request. The resource allocation policy includes a correspondence between the tag and the quantity of resources allocated for the application request. The control device 66 instructs a component of the computer to process the application request according to the quantity of resources allocated for the application request.

In this way, when processing the application request, the component of the computer may perform processing according to the quantity of resources allocated for the application request, which, to some extent, prevents a quantity of resources from being mutually preempted by multiple application requests, thereby improving service quality.

The following describes structure and functionality of the control device 66 in particular.

The control device 66 is a device, inside the computer 10, that is configured on any component of the components of the computer. When a component includes a controller (for example, a memory includes a memory controller, or a network adapter includes a network adapter controller), the control device 66 may be a control device embedded in the controller or a newly attached control device connected to the original controller. When a component does not include a controller, the control device 66 may be a newly attached controller or control device connected to the component.

Figure 2B:
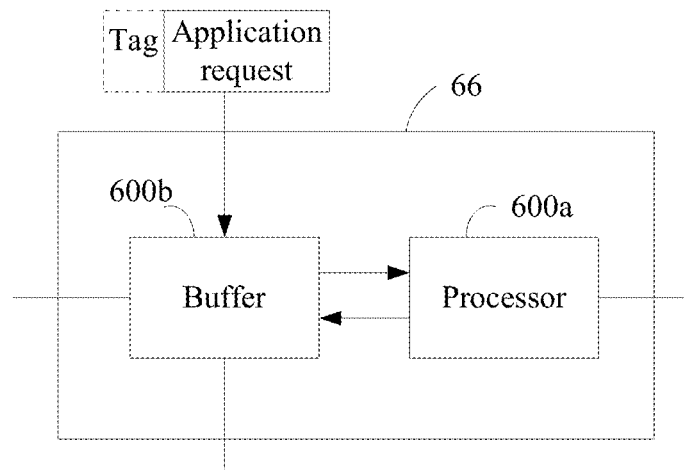
FIG. 2b is a simplified block diagram of a control device according to an embodiment of the present application.

As shown in FIG. 2b, the control device 66 may include a processor 600a.

The control device 66 is configured to receive an application request to which a tag is attached, and determine, according to the tag and a pre-stored resource allocation policy, a quantity of resources allocated for the application request. The resource allocation policy includes a correspondence between the tag and the quantity of resources allocated for the application request. The control device 66 is further configured to instruct a component of the computer to process the application request according to the quantity of resources allocated for the application request.

In addition, the control device 66 may further include a buffer 600b.

For example, the processor 600a is configured to store, in the buffer 600b, the tag-attached application request, read the tag from the buffer 600b, and determine, according to the tag and the pre-stored resource allocation policy, the quantity of resources allocated for the application request. The resource allocation policy includes the correspondence between the tag and the quantity of resources allocated for the application request. The processor 600a instructs the component of the computer to process the application request according to the quantity of resources allocated for the application request.

It should be noted that, the buffer 600b may also be a register in the processor 600a. In this case, a processing manner thereof may be as follows: the processor 600a stores, in the register of the processor 600a, the tag-attached application request. The processor 600a reads the tag from the register, and determines, according to the tag and the pre-stored resource allocation policy, the quantity of resources allocated for the application request. The resource allocation policy includes the correspondence between the tag and the quantity of resources allocated for the application request. The processor 600a instructs the component of the computer to process the application request according to the quantity of resources allocated for the application request.

Figure 3:
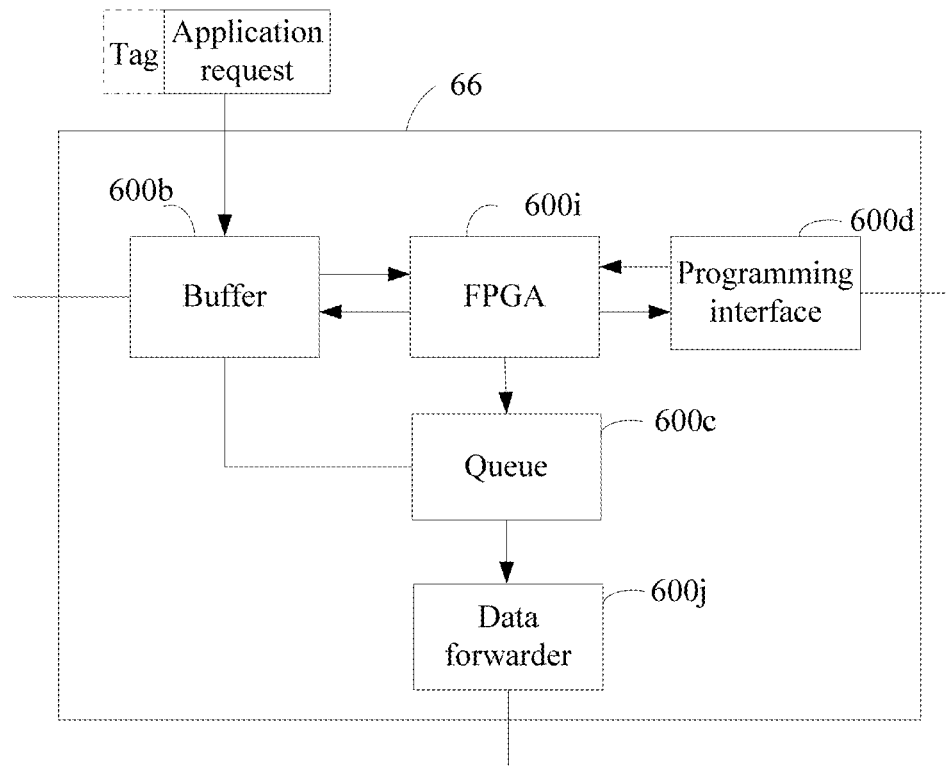
FIG. 3 is a simplified block diagram of another control device according to an embodiment of the present application.

For example, as shown in FIG. 3, an optional implementation manner is as follows: the control device 66 may include a processor 600i, a buffer 600b, and a queue 600c.

The processor 600i may be a field-programmable gate array (FPGA) or another programmable device. A resource allocation policy is built in the processor 600i, where the resource allocation policy may be a control table (as shown in Table 1) and the control table is editable.

TABLE 1

| Tag | Attribute 1 | ... | Attribute i | State 1 | ... | State i |
|---|---|---|---|---|---|---|
| Tag 1 | Value range | ... | Value range | Value | ... | Value |
| ... | | | | | | |
| Tag k | Value range | ... | Value range | Value | ... | Value |

Specifically, each entry in Table 1 corresponds to one tag. In addition, each entry of the control table includes multiple "attributes", where an "attribute" represents a quantity of resources allocated for an application request corresponding to the tag. There may be multiple types of quantities of resources, for example, target service quality, IPC (Instruction per Cycle), response time, maximum tolerance, or the like. A value range of an "attribute" may be set by a user. For example, the value range may be set as not less than 30% or not greater than 80%. In addition, each entry further includes multiple "states", where a "state" represents a quantity of resources currently consumed by the application request corresponding to the tag, and a value of the "state" may be monitored in real time and updated.

In addition, the resource allocation policy may also be firmware code and is built in an FPGA. There is no limit to a manner of storing a resource allocation policy.

The buffer 600b is a temporary buffer. When the control device 66 receives an application request carrying a tag, the application request is first placed into the buffer 600b for temporary storage.

The queue 600c is also a temporary buffer, which may be located in a same temporary buffer as the buffer 600b, or may be separated from the buffer 600b to independently serve as a temporary buffer. The queue 600c is configured to store an application request processed by the processor 600i. The queue 600c may include multiple queues, and different queues correspond to different address segments in the buffer 600b. Different queues have different priorities, and the priorities are represented in different sequences for executing, by a component of the computer, application requests in the queues, which means that different quantities of resources are allocated for different queues.

In addition, the control device 66 may further include a programming interface 600d.

The programming interface 600d is configured to implement an address space mapping mechanism, and can map the control table built in the processor 600i to physical address space of the computer 10. Node management software may access the physical address space of the computer 10 to edit the control table. For example, the programming interface 600d may provide various functions, which are used to add, modify, or delete an entry stored in the control table. In addition, the processor 600i may further provide values of all "states" in each entry of the control table of the processor 600i to the node management software, so that the node management software further adjusts the resource allocation policy after collecting statistics on the values of the "states" of all application requests.

For example, the processor 600i may acquire, from the buffer 600b, an application request carrying a tag, and query a corresponding entry in Table 1 according to the tag, so as to obtain an "attribute" of the application request. Because the "attribute" of the application request indicates a quantity of resources allocated for the application request, the processor 600i may select, from the at least two queues according to the quantity of resources allocated for the application request, a queue corresponding to the application request, and place the application request into the corresponding queue.

After placing the application request into the corresponding queue, the processor 600i may instruct a corresponding component of the computer to process the application request. Herein, the "corresponding component of the computer" refers to a component of the computer, to which the control device belongs. For example, if the control device is a control device on a cache, the "corresponding component of the computer" is the cache.

Herein, the "instructing a corresponding component of the computer to process the application request" may be that the processor 600i fetches the application request from the corresponding queue, and sends the application request to the corresponding component of the computer, or may be that the corresponding component of the computer obtains the application request from the corresponding queue.

In addition, the control device 66 may further include a data forwarder 600j. After placing different application requests into different 600c queues, the processor 600i may send an application request to the data forwarder 600j after fetching the application request from the queues; and the data forwarder 600j is configured to forward the application request to a corresponding component of the computer. That is, the corresponding component of the computer herein may obtain the application request from the corresponding queue by using the data forwarder 600j.

In addition, before placing the application request into the corresponding queue 600c, the processor 600i may perform some preprocessing operations, such as compression and encryption, on the application request, and then place the application request that has undergone the preprocessing operations into the corresponding queue 600c.

Figure 4:
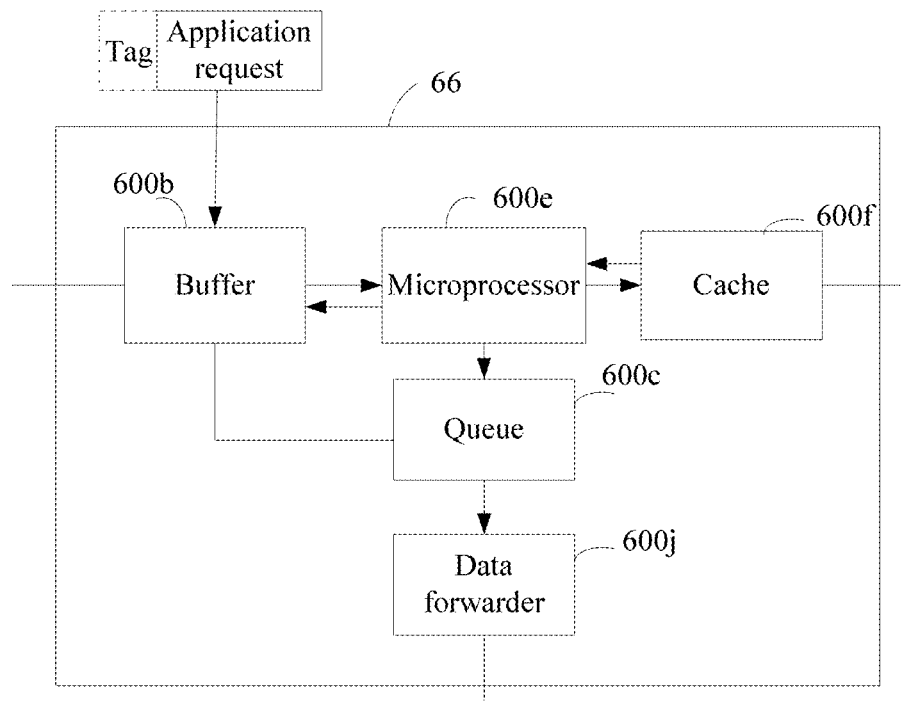
FIG. 4 is a simplified block diagram of still another control device according to an embodiment of the present application.

As shown in FIG. 4, for the control device 66, another optional implementation manner is as follows:

The control device 66 includes a buffer 600b, a queue 600c, a microprocessor 600e, and a cache 600f.

The buffer 600b and the queue 600c are the same as the buffer and the queue shown in FIG. 3 and are not described herein again.

The microprocessor 600e may be a CPU or another controller whose function is similar to that of a CPU. A difference between the microprocessor 600e and the processor 600i shown in FIG. 3 lies in that: the processor 600i serves as a programmable device, a resource allocation policy is built in the processor 600i, and the resource allocation policy is editable; the microprocessor 600e executes a function of a CPU, but a control table cannot be built in the microprocessor 600e. Therefore, the control device 66 shown in FIG. 4 further includes the cache 600f. The cache 600f stores a resource allocation policy, where the resource allocation policy refers to program code whose function is similar to that of the control table.

For example, when the control device 66 receives an application request carrying a tag, the application request is first placed into the buffer 600b. The microprocessor 600e may acquire, from a queue of application requests stored in the buffer 600b, the application request carrying the tag; read the resource allocation policy from the cache 600f into the buffer 600b; determine, according to the tag and the resource allocation policy, a quantity of resources allocated for the application request; select, from the at least two queues, a queue corresponding to the application request; and place the application request into the corresponding queue. The microprocessor 600e then fetches the application request from the corresponding queue, and sends the application request to a corresponding component of the computer.

Alternatively, the control device 66 may further include a data forwarder 600*j*. After placing different application requests into different 600*c* queues, the microprocessor 600*e* may send an application request to the data forwarder 600*j* after fetching the application request from the queues, and the data forwarder 600*j* is configured to forward the application request to a corresponding component of the computer. A manner of subsequent processing is the same as the implementation manner shown in FIG. 3 and is not described herein again.

In addition, the control device 66 shown in FIG. 4 may further include control logic (which is not shown in FIG. 4), which is used to modify the resource allocation policy stored in the cache 600*f*.

Similarly, before placing the application request into the corresponding queue 600*c*, the microprocessor 600*e* may perform some preprocessing operations, such as compression and encryption, on the application request, and then place the application request that has undergone the preprocessing operations into the corresponding queue 600*c*.

It may be understood that, if there is a buffer inside the microprocessor 600*e*, the microprocessor 600*e* may also read, into the buffer of the microprocessor 600*e*, the application request carrying the tag and the resource allocation policy stored in the cache 600*f*, process the application request in the buffer of the microprocessor 600*e*, and place the application request into the corresponding queue 600*c* according to a processing result.

Figure 5:
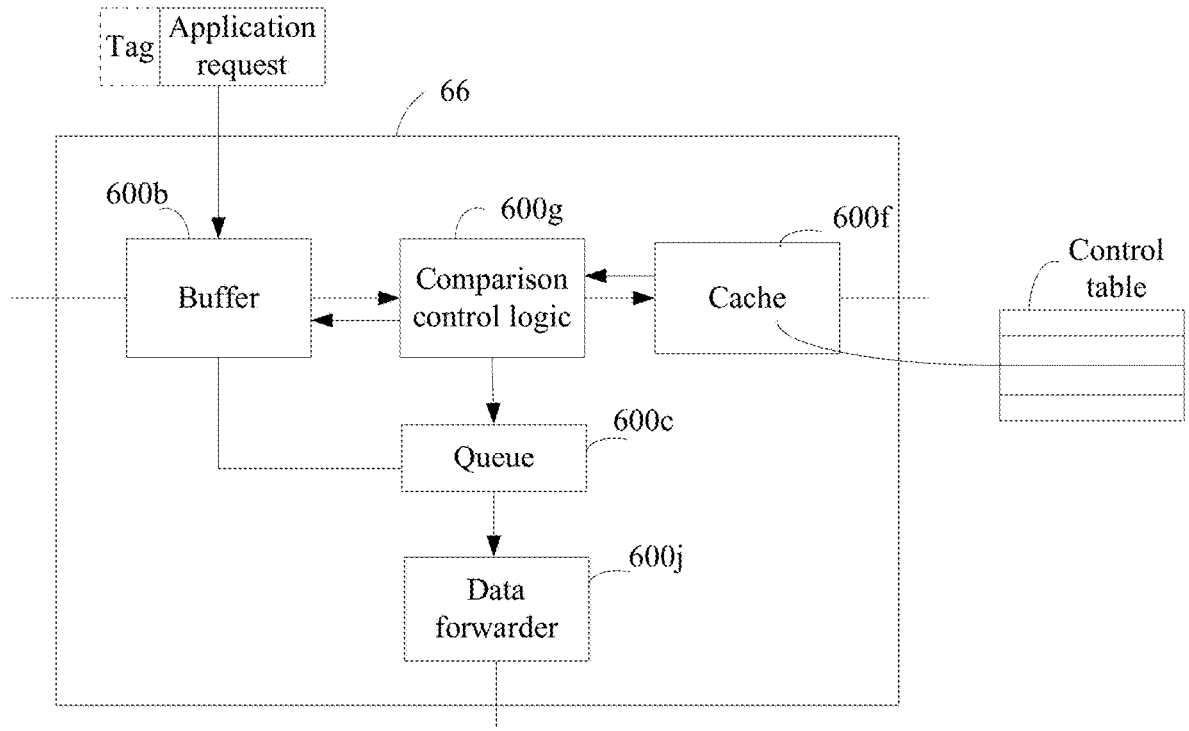
FIG. 5 is a simplified block diagram of yet another control device according to an embodiment of the present application.

For the control device 66, still another optional implementation manner is as follows:

As shown in FIG. 5, the control device 66 may include a buffer 600*b*, comparison control logic 600*g*, a cache 600*f*, and a queue 600*c*.

Herein, the comparison control logic 600*g* may be an application-specific integrated circuit (ASIC) or another integrated circuit.

The buffer 600*b* is consistent with the buffer described above.

The cache 600*f* stores a control table (Table 1).

When the control device 66 receives an application request carrying a tag, the application request is first placed into a corresponding queue. The queue may be a part of cache space in the buffer 600*b*, or an independent buffer. The comparison control logic 600*g* reads the application request from the queue into the buffer 600*b* (or a buffer of the comparison control logic 600*g*), and sends a read instruction to the cache 600*f* according to the tag of the application request, to request the cache 600*f* to return an entry corresponding to the tag. Content of the entry is loaded to the buffer 600*b* (or the buffer of the comparison control logic 600*g*); the comparison control logic 600*g* selects the corresponding queue from the at least two queues according to the content of the entry in the buffer 600*b* (or the buffer of the comparison control logic 600*g*), so as to place the application request into the queue 600*c*. The comparison control logic 600*g* then fetches the application request from the corresponding queue, and sends the application request to a corresponding component of the computer.

Alternatively, the control device 66 may further include a data forwarder 600*j*. After placing different application requests into different 600*c* queues, the comparison control logic 600*g* may send an application request to the data forwarder 600*j* after fetching the application request from the queues, and the data forwarder 600*j* is configured to forward the application request to a corresponding component of the computer.

Similarly, the comparison control logic 600*g* may further perform, in the buffer 600*b*, some preprocessing operations, such as compression and encryption, on the application request.

In addition, the control device 66 may further include a programming interface 600*d*, which is configured to edit the control table stored in the cache 600*f*. For a specific function of the programming interface 600*d*, reference may be made to the descriptions of the programming interface 600*d* in the embodiment shown in FIG. 3.

It should be noted that, the control devices 66 on the components of the computer 10 may not be absolutely the same. Specifically, resource allocation policies stored by the control devices 66 may not be absolutely the same. For example, for a same application request, when the application request needs to access a memory, a quantity of resources allocated for the application request by the memory may reach 80%. When the application request needs to be output by using an I/O device, a quantity of resources allocated for the application request by an I/O interconnection network may be only 70%.

By using the control device provided by this embodiment of the present application, a quantity of resources allocated for an application request may be determined according to a tag of the application request and a pre-stored resource allocation policy, and a component of a computer is instructed to process the application request according to the quantity of resources allocated for the application request. In this way, when processing the application request, the component of the computer may perform processing according to the quantity of resources allocated for the application request, which, to some extent, prevents a quantity of resources from being mutually preempted by multiple application requests, thereby improving service quality.

In this embodiment of the present application, the control devices 66 on the components of the computer may form a control device network, which connects all the control devices 66, as shown by a dashed line in FIG. 1 or FIG. 2*a*. Each control device includes one physical access point, and accesses the control device network through the physical access point. The control device network may transmit data by using the Peripheral Component Interconnect Express (PCIe) protocol or another protocol, and a type of the protocol is not limited in this embodiment of the present application.

In this embodiment of the present application, node management software (which is not shown in FIG. 1) may be further included, where the node management software may be a module in an operating system, or a module at a middle software layer (Hypervisor) between the operating system and computer hardware, and runs on one or multiple processing units 11. The node management software manages all the control devices 66 through the control device network, for example, performing an initialization operation on the control devices 66, collecting "state" values of the control devices 66, determining or adjusting the resource allocation policy according to the collected "state" values, sending the resource allocation policy to the control devices 66, and the like.

Figure 6:
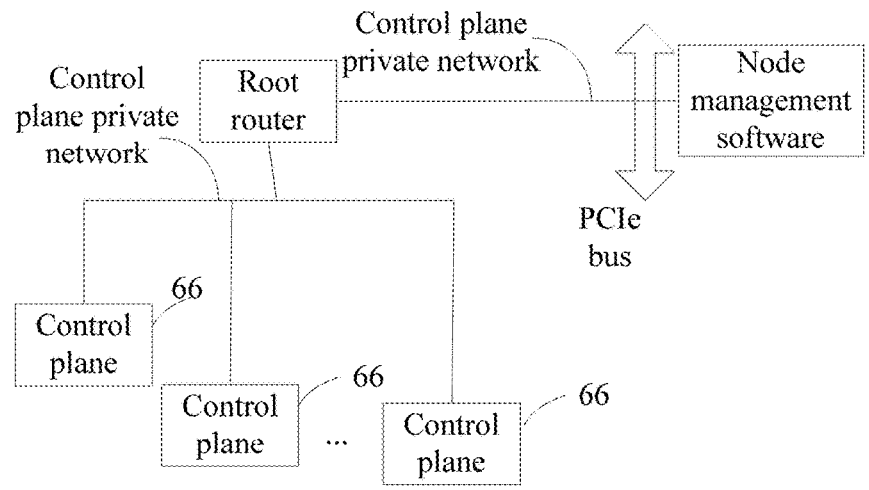
FIG. 6 is a schematic diagram of a network architecture of a control plane according to an embodiment of the present application.

Optionally, as shown in FIG. 6, an implementation manner is as follows: a dedicated network is established in the computer 10, and all the control devices 66 are connected by using a root router, where the physical access points of all the control devices 66 are connected to the dedicated network. The dedicated network may provide a communication protocol, where the communication protocol is responsible for defining a format of a message packet for accessing the control devices 66. For example, the message packet may include but not limited to a control device number or control device ID, a control device command (for example, adding a resource allocation policy, deleting a resource allocation policy, or modifying a resource allocation policy), and a control device command parameter. In addition, in order to enable the control devices 66 to communicate with an external device of the computer 10 or the node management software, the message packet may also be transmitted after being encapsulated by using the PCIe protocol or another protocol.

Optionally, another implementation manner is as follows: each control device 66 performs data exchange with the node management software in an address space mapping manner. Specifically, each control device 66 maps the control table or the resource allocation policy of the control device 66 into the physical address space of the computer 10. The node management software may access the address space to implement editing of the control table or the resource allocation policy.

Figure 7:
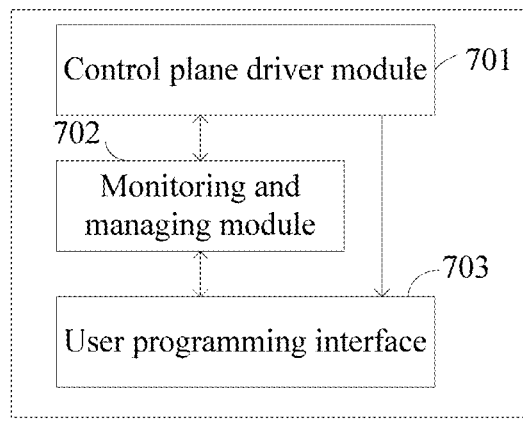
FIG. 7 is a schematic structural diagram of node management software according to an embodiment of the present application.

As shown in FIG. 7, node management software may include a control device driver module 701, a monitoring and managing module 702, and a user programming interface 703.

The control device driver module 701 is configured to scan and identify a new control device 66 of a component of a computer, and initialize the control device 66; and send a resource allocation policy to the control device 66. In addition, the control device driver module 701 is further configured to add, modify, or delete the resource allocation policy.

The monitoring and managing module 702 is configured to store a collected "state" value of each control device 66, perform correlation analysis on the collected "state" value of each control device 66, and determine the resource allocation policy in combination with a user demand.

The user programming interface 703 is configured to provide an application programming interface (API), so that another software or application program may implement programming of the control device 66 by using the API. For example, the API includes at least the following interfaces: an initialization command, a command for adding a resource allocation policy a command for modifying a resource allocation policy, a command for deleting a resource allocation policy, and the like.

The control device, shown in FIG. 2b, FIG. 3, FIG. 4, or FIG. 5, is only an example and is not intended to set specific limit to the present application. For example, the control device may also be an application-specific integrated circuit. No matter which form the control device is in, the control device implements, in a computer, a function of a control device. The computer described herein may be a personal computer, a server, a mobile phone, or a palmtop computer; the present application sets no limit to a specific implementation form of the computer. This application document does not describe other system embodiments or application scenarios one by one.

Figure 8:
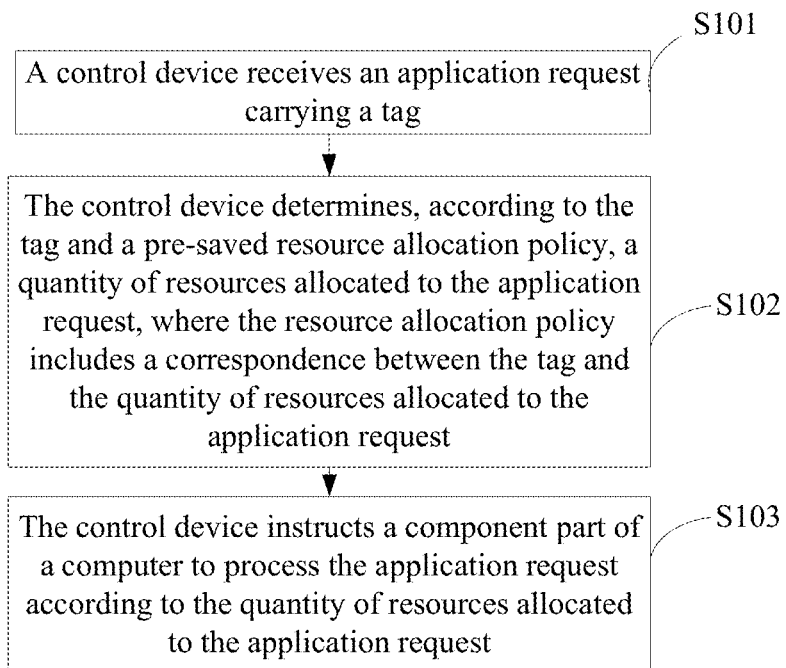
FIG. 8 is a flowchart of a data processing method according to an embodiment of the present application.

The following describes a procedure in which a control device is configured inside a computer to implement data processing in an embodiment of the present application. A data processing method in this embodiment of the present application may be implemented in the control device shown in FIG. 2b, FIG. 3, FIG. 4, or FIG. 5. As shown in FIG. 8, the method includes:

Step S101: The control device receives an application request carrying a tag.

The application request carrying the tag may be from the processing unit 11 shown in FIG. 1 or FIG. 2a, or may be from a network adapter. When the application request carrying the tag is from the processing unit 11, the processing unit 11 needs to attach the tag to the application request when receiving or generating the application request. Specifically, for a manner of attaching the tag to the application request by the processing unit 11, reference may be made to the embodiment shown in FIG. 2a, and details are not described herein again.

When the application request carrying the tag is from the network adapter, one case is that: when the network adapter receives the application request, the application request is an application request carrying a tag. Another case is that: when the network adapter receives a message packet, the application request is obtained by parsing the message packet, and then the application request is tagged.

In addition, before step S101, an operating system or a Hypervisor may perform an initialization operation on each control device 66 in a computer by using node management software, so that each control device is in a working state. After the control device 66 has undergone the initialization operation, the node management software sends a resource allocation policy to each control device 66 through a control device network.

Step S102: The control device determines, according to the tag and a pre-stored resource allocation policy, a quantity of resources allocated for the application request, where the resource allocation policy includes a correspondence between the tag and the quantity of resources allocated for the application request.

Specifically, the control device writes, into a first buffer (the buffer 600b shown in FIG. 2b) of the control device, the application request carrying the tag, and reads the tag from the first buffer.

The resource allocation policy is sent to the control device 66 by using the node management software, and the tag attached to the application request by the processing unit 11 is also defined by using the node management software. Therefore, the tag carried in the application request may be associated with a tag in the resource allocation policy, and the control device may determine, according to the tag and the pre-stored resource allocation policy, the quantity of resources allocated for the application request.

The quantity of resources herein may be a quantity of resources allocated for the application request by a component of the computer in which the control device is located, or may be a percentage value, or may further include priority information and the like. For example, when the component of the computer in which the control device is located is a memory, the quantity of resources may be a size of memory space, or a percentage value (for example, 80%) of memory space, or another information item (reference is made to the descriptions of the "attribute" in Table 1). This embodiment of the present application sets no limit to an expression form of the quantity of resources, and any one shall fall within the protection scope of this embodiment of the present application provided that it represents a priority or speed of processing the application request by the component.

In addition, the resource allocation policy herein may be built in a processor of the control device (reference is made to the implementation manner shown in FIG. 3), or may be stored in a cache of the control device (reference is made to the implementation manner shown in FIG. 3).

Step S103: The control device instructs a component of the computer to process the application request according to the quantity of resources allocated for the application request.

The instructing a component of the computer to process the application request according to the quantity of resources allocated for the application request may be sending the quantity of resources allocated for the application request and the application request to the component, or may be sending the application request to the component and notifying the component of a manner of processing the application request.

In this embodiment of the present application, a control device may determine, according to a tag carried in an application request and a correspondence between the tag and a quantity of resources allocated for the application request, the quantity of resources allocated for the application request, and then instruct a component of a computer to process the application request according to the quantity of resources allocated for the application request. Therefore, different quantities of resources may be allocated for different application requests, thereby improving service quality.

Optionally, when processing of the application request is not complete after step S103, it is still required to apply for a resource from another component of the computer and process the application request, the processed application request may be forwarded to a control device on the another component of the computer for processing, and a processing manner thereof is similar to step S101 to step S103. It should be noted that, the application request that is forwarded to the control device on the another component of the computer also carries the tag.

Figure 9:
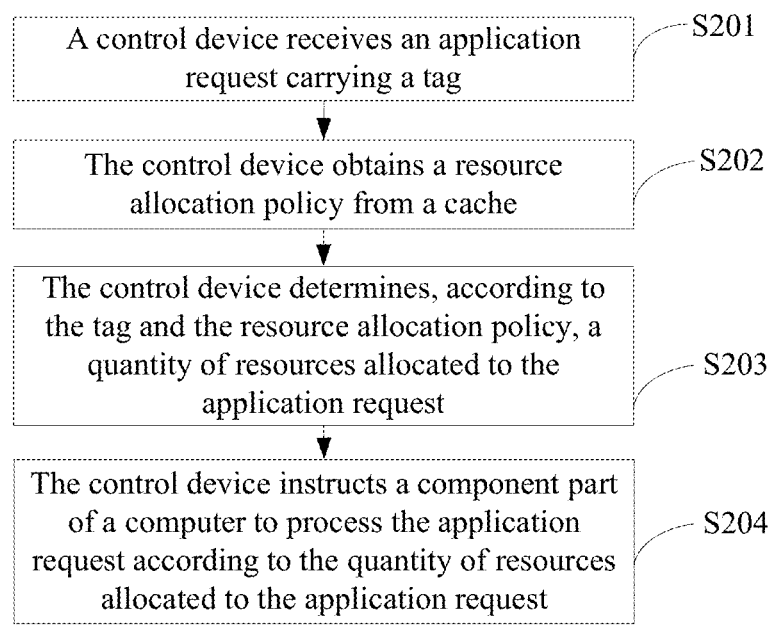
FIG. 9 is a flowchart of another data processing method according to an embodiment of the present application.

The following describes another implementation manner of a data processing method in an embodiment of the present application. As shown in FIG. 9, the method includes:

Step S201: It is the same as step S101.

Step S202: The control device obtains a resource allocation policy from a cache.

When the resource allocation policy is software code, the control device may load the resource allocation policy to a buffer of a processor of the control device. When the resource allocation policy is the control table shown in Table 1, the control device may send a query instruction to the cache, where the query instruction includes the tag, and the cache searches the control table for a corresponding entry according to the tag and returns the entry to the control device. The control device loads the entry to the buffer of the processor of the control device. Specifically, the entry includes a correspondence between the tag and a quantity of resources allocated for the application request.

Step S203: The control device determines, according to the tag and the pre-stored resource allocation policy, a quantity of resources allocated for the application request.

Step S204: It is the same as step S103.

In this embodiment of the present application, a control device may determine, according to a tag carried in an application request and a correspondence between the tag and a quantity of resources allocated for the application request, the quantity of resources allocated for the application request, and then instruct a component of a computer to process the application request according to the quantity of resources allocated for the application request. Therefore, different quantities of resources may be allocated for different application requests, thereby improving service quality.

Figure 10:
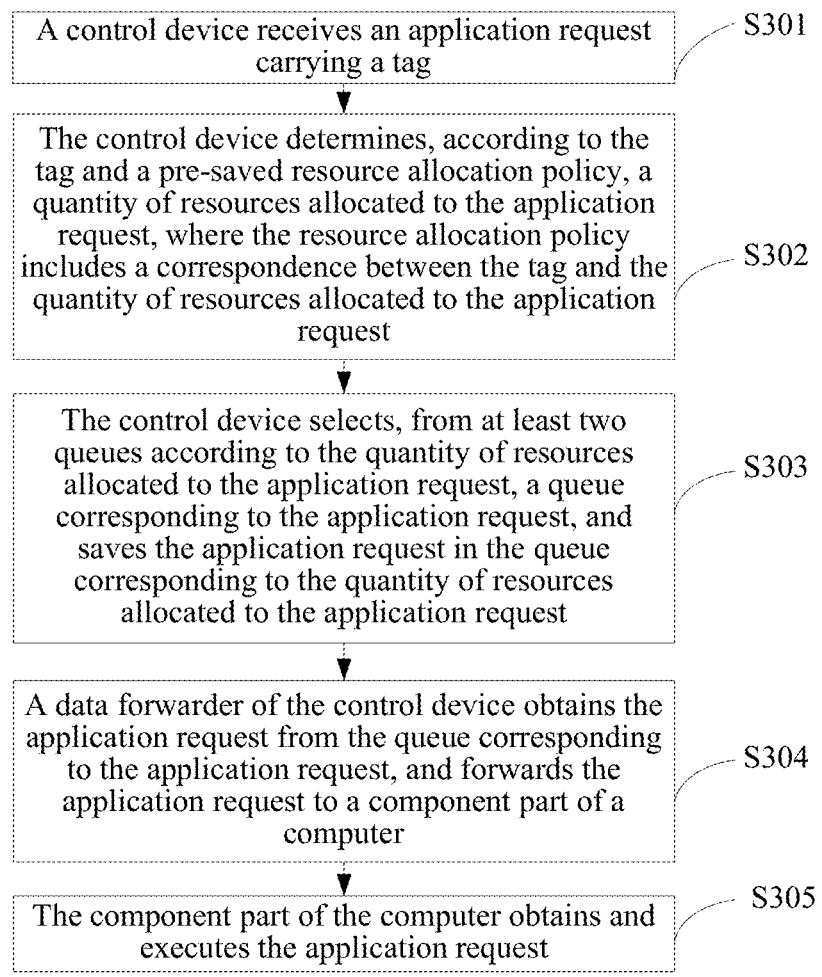
FIG. 10 is a flowchart of still another data processing method according to an embodiment of the present application.

The following describes another implementation manner of a data processing method in an embodiment of the present application. As shown in FIG. 10, the method includes:

Step S301: It is the same as step S101.

Step S302: It is the same as step S102 and is the same as steps S202 and S203.

Step S303: The control device selects, from at least two queues according to the quantity of resources allocated for the application request, a queue corresponding to the application request, and stores the application request in the queue corresponding to the application request.

Specifically, the control device may include a second buffer, and the queue is stored in the second buffer (reference may be made to the implementation manner shown in FIG. 3, FIG. 4, or FIG. 5). The second buffer includes at least two queues, where each queue corresponds to a range of quantities of resources, and a priority of each queue is different.

Step S304: A data forwarder (for example, the data forwarder 600$j$ in FIG. 3 to FIG. 5) of the control device obtains the application request from the queue corresponding to the application request, and forwards the application request to a component of the computer.

Step S305: The component of the computer obtains and executes the application request.

It should be noted that, step S304 is an optional step, and the component of the computer may also directly obtain the application request from the corresponding queue.

For example, the second buffer may include three queues, which are a high-priority queue, a medium-priority queue, and a low-priority queue. A percentage value of a quantity of resources that corresponds to the high-priority queue is 70% to 80%. If the quantity of resources allocated for the application request is 76%, the application request is placed into the high-priority queue. The high-priority queue means a preferential processing sequence or a relatively high processing speed. The component of the computer may preferentially obtain the application request from the high-priority queue and execute the application request. Optionally, the control device may further refer to another factor, for example, a quantity of resources that have been used by the application request currently, to consider into which queue the application request is placed. In this application document, application scenarios are not described one by one.

It may be understood that, each queue may include multiple to-be-processed application requests. For the multiple to-be-processed application requests in each queue, the component of the computer may perform processing according to a first in first out principle or another principle.

In addition, after the control device places the application requests into the corresponding queue, the control device may also fetch the application requests from the queue in sequence (when there are multiple application requests in the queue), and then send the application requests to the component of the computer for processing.

In this embodiment of the present application, a control device may determine, according to a tag carried in an application request and a correspondence between the tag and a quantity of resources allocated for the application request, the quantity of resources allocated for the application request, place the application request into a corresponding queue according to the quantity of resources allocated for the application request, and then obtain the application request from the queue corresponding to the application request and send the application request to a data forwarder. The data forwarder forwards the application request to a component of a computer for executing, thereby improving service quality.

Optionally, in the implementation manner of the data processing method shown in FIG. 8, FIG. 9, or FIG. 10, the following steps may be further included:

After execution of the application request is complete, the component of the computer may feed back a message to an operating system, to explain that the application request has been processed. In this case, a resource reclamation message may be sent to the control device by using the node management software, where the resource reclamation message is used to delete the resource allocation policy in the control device.

The following further describes the processing procedures in FIG. 8 to FIG. 10 by using an example in which an application request for video playback is processed.

Step 1: A user clicks a video file in a local computer.

Step 2: A CPU generates a memory access request to read the video file.

Step 3: The CPU tags the memory access request, and sends, to a control device on a memory, the memory access request carrying a tag.

Step 4: The control device on the memory determines, according to the tag, memory space allocated for the memory access request, and further places the memory access request into a corresponding queue according to the allocated memory space.

Step 5: The control device on the memory fetches the memory access request from the queue, and sends the memory access request to the memory, so as to execute the memory access request.

Step 6: The memory sends a response to the CPU after loading the video file.

Step 7: The CPU obtains the video file from the memory, and sends a hardware acceleration request to a GPU, to request the GPU to perform hardware decoding on the video file, where the hardware acceleration request carries the video file and the tag.

Step 8: A control device on the GPU determines, according to the tag, a quantity of hardware acceleration resources allocated for the video file, and then places the hardware acceleration request into a corresponding queue according to the quantity of allocated hardware acceleration resources.

Step 9: The control device on the GPU fetches the hardware acceleration request from the queue, and sends the hardware acceleration request to the GPU.

Step 10: The GPU performs hardware acceleration processing on the video file according to the hardware acceleration request.

Step 11: After the processing is complete, if it is not required to perform other processing on the video file, the GPU may send an output request to a southbridge (for example, the I/O control network shown in FIG. 1 or FIG. 2*a*), where the output request includes the video file that has undergone the hardware acceleration processing and the tag.

Step 12: A control device on the southbridge determines, according to the tag, bandwidth allocated for the video file, and then places the output request into a corresponding queue according to the allocated bandwidth.

Step 13: The southbridge fetches the video file from the queue, and sends the video file to a display.

Step 14: The display displays the video file.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A computer system, comprising:
   a processor and a plurality of components directly or indirectly connected to the processor,
   wherein each of the plurality of components is coupled to a control device, and is configured to provide resources for one or more application programs running in the computer system;
   wherein the processor, when executing an application program, is configured to attach a tag to an application request, and send the tag-attached application request to a first control device coupled with a first component and a second control device coupled with a second component, wherein the tag identifies a type of the application program;
   wherein the first control device is configured to:
   determine, based on the tag and a first resource allocation policy, a first resource level for the application request; and
   instruct the first component to allocate a first amount of resources corresponding to the first resource level to the application request, and instruct the first component to process the application request in accordance with the first amount of resources allocated to the application request;
   wherein the second control device is configured to:
   determine, based on the tag and a second resource allocation policy, a second resource level for the application request; and
   instruct the second component to allocate a second amount of resources corresponding to the second resource level for the application request, and instruct the second component to process the application request in accordance with the second amount of resources allocated to the application request.

2. The computer system according to claim 1, wherein the plurality components comprise one or more of the following:
   a high-speed on-chip interconnection network,
   a cache unit,
   a memory unit,
   a graphic processing unit,
   an input/output (I/O) interconnection network,
   a hard disk,
   a network adapter, and
   a display unit.

3. The computer system according to claim 2, wherein the processor is connected to the high-speed on-chip interconnection network, and the high-speed on-chip interconnection network is connected to one or more of:
   the cache unit,
   the memory unit,
   the graphic processing unit, and
   the input/output (I/O) interconnection network;
   and wherein the I/O interconnection network is connected to one or more of:
   the hard disk, the network adapter, and the display unit.

4. The computer system according to claim 1, wherein the first control device comprises a buffer storing at least two queues, each of the at least two queues corresponds to a range of resource levels, and the at least two queues have different processing priorities,
   wherein the first control device is further configured to identify a queue from the at least two queues based on the determined first resource level and write the tag-attached application request into the identified queue, and
   wherein the first component is configured to:
   obtain the application request from the identified queue;
   allocate the first amount of resources corresponding to the first resource level to the application request; and
   process the application request in accordance with the first amount of resources allocated to the application request.

5. The computer system according to claim 1, wherein a control table is stored in the first control device, the control table includes a plurality of entries, each entry corresponds to a tag and one or more resources levels for the tag, wherein in instructing the first component to allocate the first amount of resources corresponding to the first resource level to the application request, the first control device is configured to:
   query the control table to obtain the first resource level according to the first resource allocation policy and the tag; and
   determine the first amount of resources allocated to the application request based on the first resource level.

6. The computer system according to claim 5, further comprising a memory storing a management program for execution by the processor, and the processor, when executing the management program, is configured to define the first resource allocation policy, and write the first resource allocation policy into the control table in the first control device.

7. The computer system according to claim 6, wherein the processor, when executing the management program, is further configured to define one or more tags, and write the defined tags into a tag register.

8. A method for a computer system to process multiple application programs, wherein the computer system comprises a processor and a plurality of components directly or indirectly connected to the processor, and each of the plurality of components is coupled to a control device, wherein the method comprises:
   attaching, by the processor when executing an application program, a tag to an application request, wherein the tag identifies a type of the application program;
   sending, by the processor, the tag-attached application request to a first control device coupled with a first component and a second control device coupled with a second component;
   determining, by the first control device based on the tag and a first resource allocation policy, a first resource level for the application request;
   allocating, by the first component, a first amount of resources corresponding to the first resource level to the application request;
   processing, by the first component the application request in accordance with the first amount of resources allocated to the application request;
   determining, by the second control device based on the tag and a second resource allocation policy, a second resource level for the application request;
   allocating, by the second component, a second amount of resources corresponding to the second resource level to the application request; and
   processing, by the second component, the application request in accordance with the second amount of resources allocated to the application request.

9. The method according to claim 8, wherein the first control device comprises a buffer storing at least two queues, each of the at least two queues corresponds to a range of resource levels, and the at least two queues have different processing priorities, the method further comprising:
- identifying, by the first control device, a queue from the at least two queues based on the first determined resource level and write the tag-attached application request into the identified queue, and
- obtaining, by the first component the application request from the identified queue.

10. The method according to claim 8, wherein a control table is stored in the first control device, the control table includes a plurality of entries, each entry corresponds to a tag and one or more resources levels for the tag, wherein the method further comprises:
- querying, by the first control device, the control table to obtain a first resource level according to the first resource allocation policy and the tag; and
- determine, by the first control device, the amount of resources allocated to the application request based on the first determined resource level.

11. The method according to claim 10, wherein the computer system further comprises a memory for storing a management program for execution by the processor, and the method further comprising:
- defining, by the processor, the first resource allocation policy by executing the management program, and
- writing the first resource allocation policy into the control table.

12. The method according to claim 11, wherein the processor includes a tag register, and the method further comprising:
- defining, by the processor, the tag by executing the management program; and
- writing, by the processor, the tag into the tag register.

13. The method according to claim 8, wherein the plurality components comprise one or more of the following:
- a high-speed on-chip interconnection network,
- a cache unit,
- a memory unit,
- a graphic processing unit,
- an input/output (I/O) interconnection network,
- a hard disk,
- a network adapter, and
- a display unit.

14. The method according to claim 13, wherein the processor is connected to the high-speed on-chip interconnection network, and the high-speed on-chip interconnection network is connected to one or more of:
- the cache unit,
- the memory unit,
- the graphic processing unit, and
- the input/output (I/O) interconnection network;

and wherein the I/O interconnection network is connected to one or more of:
- the hard disk, the network adapter, and the display unit.

* * * * *